US008321197B2

(12) United States Patent
Gaudet et al.

(10) Patent No.: US 8,321,197 B2
(45) Date of Patent: Nov. 27, 2012

(54) METHOD AND PROCESS FOR PERFORMING CATEGORY-BASED ANALYSIS, EVALUATION, AND PRESCRIPTIVE PRACTICE CREATION UPON STENOGRAPHICALLY WRITTEN AND VOICE-WRITTEN TEXT FILES

(76) Inventors: Teresa Ruth Gaudet, Naperville, IL (US); Gordon James Gaudet, Naperville, IL (US); Gary Kenneth Pollreis, Phoenix, AZ (US); Sandra Joyce Natale, Chicago Heights, IL (US)

( * ) Notice: Subject to any disclaimer, the term of this patent is extended or adjusted under 35 U.S.C. 154(b) by 1295 days.

(21) Appl. No.: 11/975,155

(22) Filed: Oct. 17, 2007

(65) Prior Publication Data

US 2009/0012789 A1     Jan. 8, 2009

Related U.S. Application Data

(60) Provisional application No. 60/852,720, filed on Oct. 18, 2006.

(51) Int. Cl.
*G06F 17/27* (2006.01)
(52) U.S. Cl. .................... 704/9; 704/252; 704/1; 704/3; 704/7; 704/10
(58) Field of Classification Search .............. 704/9, 270, 704/251, 7, 8, 10, 1, 3; 434/158, 185
See application file for complete search history.

(56) References Cited

U.S. PATENT DOCUMENTS

| | | | |
|---|---|---|---|
| 3,368,156 A | 2/1968 | Kam | |
| 4,525,803 A | 6/1985 | Vidalin et al. | |
| 4,750,122 A | 6/1988 | Kaji et al. | |
| 4,807,182 A * | 2/1989 | Queen | ................ 715/210 |
| 4,879,648 A | 11/1989 | Cochran et al. | |
| 4,979,227 A | 12/1990 | Mittelbavh et al. | |
| 5,142,619 A | 8/1992 | Webster, III | |
| 5,418,948 A | 5/1995 | Turtle | |
| 5,438,661 A | 8/1995 | Ogawa | |
| 5,634,051 A | 5/1997 | Thomson | |
| 5,642,435 A | 6/1997 | Loris | |
| RE35,861 E | 7/1998 | Queen | |

(Continued)

OTHER PUBLICATIONS

Aist et al., Adapting Human Tutorial Interventions for a Reading Tutor that Listens: Using Continuous Speech Recognition in Interactive Educational Multimedia, Sep. 1997, Proceedings of the CALL'97 Conference on Multimedia.*

*Primary Examiner* — Qi Han
(74) *Attorney, Agent, or Firm* — Wood, Phillips, Katz, Clark & Mortimer

(57) ABSTRACT

System and method for electronically identifying and analyzing the type and frequency of errors and mismatches in a stenographically or voice written text against a stored master file and dynamically creating personalized user feedback, drills, and practice based on identified errors and mismatches from within the context of the stored master file. The system provides the user with a plurality of methods to enter a text file for error identification and analysis including both realtime and non-realtime input. The text input is then compared to a stored master file through a word-by-word iterative process which produces a comparison of writing input and stored master wherein errors and mismatches are identified and grouped in a plurality of pre-defined and user-selected categories, each of which is color-coded to facilitate pattern recognition of type and frequency of errors and mismatches in the submitted writing.

17 Claims, 20 Drawing Sheets

U.S. PATENT DOCUMENTS

| | | | |
|---|---|---|---|
| 5,819,300 A | 10/1998 | Kohno et al. | |
| 5,926,812 A | 7/1999 | Hilsenrath | |
| 6,041,292 A * | 3/2000 | Jochim | 704/3 |
| 6,212,494 B1 | 4/2001 | Boguraev | |
| 6,263,348 B1 | 7/2001 | Kathrow et al. | |
| 6,295,529 B1 | 9/2001 | Corston-Oliver et al. | |
| 6,442,606 B1 | 8/2002 | Subbaroyan | |
| 6,526,410 B1 | 2/2003 | Aoyama et al. | |
| 6,560,620 B1 * | 5/2003 | Ching | 715/229 |
| 6,615,209 B1 | 9/2003 | Gomes et al. | |
| 6,658,423 B1 | 12/2003 | Pugh | |
| 6,658,626 B1 | 12/2003 | Aiken | |
| 6,678,694 B1 | 1/2004 | Zimmerman et al. | |
| 6,738,765 B1 | 5/2004 | Wakefield et al. | |
| 6,742,003 B2 | 5/2004 | Heckerman et al. | |
| 6,963,869 B2 | 11/2005 | Burrows | |
| 6,976,170 B1 | 12/2005 | Kelly | |
| 6,978,419 B1 | 12/2005 | Kantrowitz | |
| 6,978,420 B2 | 12/2005 | Ching | |
| 6,990,628 B1 | 1/2006 | Palmer | |
| 7,139,756 B2 | 11/2006 | Cooper | |
| 7,143,348 B1 | 11/2006 | Krause | |
| 7,153,140 B2 * | 12/2006 | Ivanir et al. | 434/322 |
| 7,171,349 B1 | 1/2007 | Wakefield et al. | |
| 7,251,665 B1 | 7/2007 | Dunning | |
| 7,260,773 B2 | 8/2007 | Zernik | |
| 2002/0046200 A1 * | 4/2002 | Floven et al. | 706/61 |
| 2002/0049588 A1 * | 4/2002 | Bennett et al. | 704/235 |
| 2002/0086269 A1 * | 7/2002 | Shpiro | 434/156 |
| 2002/0133340 A1 * | 9/2002 | Basson et al. | 704/235 |
| 2004/0049385 A1 * | 3/2004 | Lovance et al. | 704/235 |
| 2004/0063085 A1 * | 4/2004 | Ivanir et al. | 434/322 |
| 2005/0044487 A1 * | 2/2005 | Bellegarda et al. | 715/511 |
| 2006/0069558 A1 * | 3/2006 | Beattie et al. | 704/235 |
| 2006/0099563 A1 * | 5/2006 | Liu et al. | 434/350 |
| 2007/0299664 A1 * | 12/2007 | Peters et al. | 704/235 |
| 2009/0265160 A1 * | 10/2009 | Williams et al. | 704/9 |
| 2010/0082333 A1 * | 4/2010 | Al-Shammari | 704/10 |

* cited by examiner

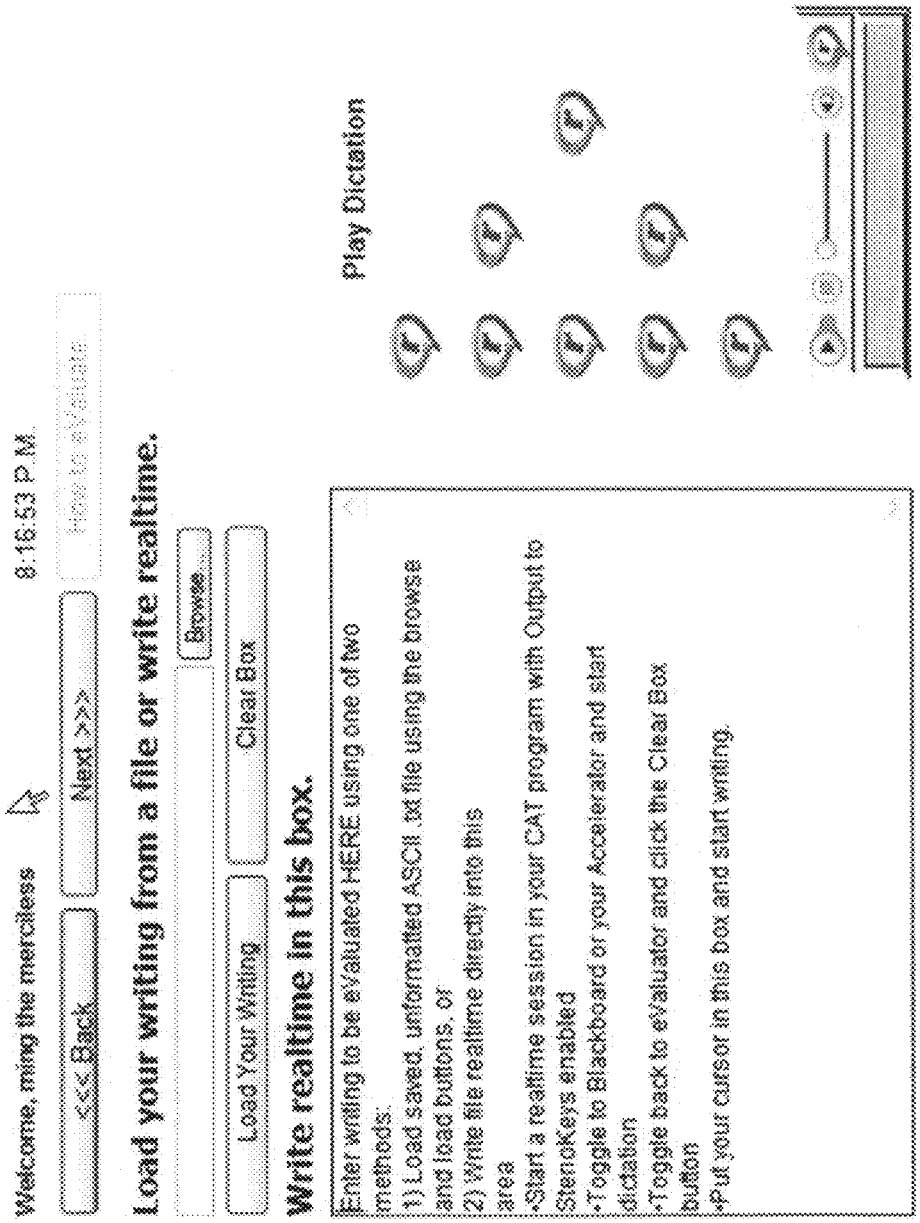

FIG. 9

His [___] will instruct you in considering damages in this case [___] have the right to consider the nature and extent and duration of the injury. Well, we have discussed somewhat the nature of the injury [___] and it is pretty bad [___] and the extent of the injury is very extensive [___] and the duration of it is permanent [___] that is why you are given the life tables of 48 . 3 at age 22 [___] because he has already gone through four years of this ailroad. So he is entitled to whatever has happened to him in the four years and in the future as the judge will instruct you on the law. In addition to that, he is entitled to damages for disability and disfigurement [___] disability is tremendous [___] is and the disfigurement is industry. You have had occasion to observe anymore in the courtroom and you have seen his buildup shoe and the heel . [___] has to walk on his toes even with the buildup part [ remember had [___] the doctor said [___] give me that crutch and you walk . You can see what a situation he is in had he can't bend his ankle [___] and he can't bend his knee . This boy is disabled for the rest of life life [___] and there are no [___] haves [___] ands , or buts about it from anything . Now , ladies and gentlemen, you have the right to consider other factors in this case [___] too , You saw that leg . You all know what he did before , about his athletics

FIG. 13

FIG. 17 is tremendous _ is and the disfigurement is sion to observe anymore in the courtroom _ o shoe and the heel . He has to walk on part _ remember had give me t and rutch and you walk . _ You s in had he can't bend his ankle _ and he can't isabled for the rest of Liz life _ and there are about it from anything . Now , ladies and ht to consider other factors in this case too .

METHOD AND PROCESS FOR PERFORMING CATEGORY-BASED ANALYSIS, EVALUATION, AND PRESCRIPTIVE PRACTICE CREATION UPON STENOGRAPHICALLY WRITTEN AND VOICE-WRITTEN TEXT FILES

CROSS-REFERENCE TO RELATED APPLICATIONS

This application claims the benefit of provisional patent application Ser. No. 60/852,720 filed 2006 Oct. 18 by the present inventor.

FEDERALLY SPONSORED RESEARCH

Not Applicable

BACKGROUND

1. Field of Invention

The present invention relates to machine and voice stenographic education and more specifically to a software program to perform error analysis and evaluation and dynamically create prescriptive practice from submitted stenographic writings, when such writings are compared to reference masters. The present invention relates further to the creation of a method and process which extensively categorizes identified errors, thus passively identifying relationships between, and frequency of a plurality of types of errors in a manner such that the writer is easily able to determine relative importance of error types and efficiently prioritize practice. The present invention relates further to the use of error identification to dynamically create from each performed analysis remedial practice specific to each writer's need for corrective activity.

2. Prior Art

When training a machine or voice stenographic writer to perform the required functions of the profession, writers typically listen to a plurality of practice dictations of judicial, broadcast, and related spoken word narratives. While listening, each writer writes each dictation using stenographic shorthand machine or voice writing software program(s) applying a shorthand theory previously learned to translate the spoken word heard into either strokes executed on a stenographic machine or voice commands re-dictated into speech recognition software. The result is a paper text or electronic file representing the English (or other language) text of the original dictation with varying degrees of accuracy depending upon the writer's proficiency. The process of rendering acceptable translation is complicated by the need of each writer to capture the spoken word at speeds up to and sometimes exceeding 240 words per minute in order to be able to create an accurate record of multiple speakers.

Writers have typically attempted to develop the psychomotor skill of stenographic writing by repeatedly writing dictations at one speed until an acceptable degree of accuracy is achieved and then moving on to a higher level of speed and repeating the practice process. At each practice level, a certain portion of the writer's writing does not correspond to the original spoken text, producing errors in the stenographic writing. When this occurs, these errors must be identified so that appropriate corrective action may be taken to eliminate them in future writings.

To determine each writer's progress in these activities, writers and their teachers typically attempt to identify errors and manually create remedial practice material designed to correct identified deficiencies. To accomplish these objectives, it has been traditionally required that an expert writer review the writer or trainee's writing element by element against a reference master document of the original writing, noting discrepancies. The expert writer may then attempt to manually compile lists of related discrepancies, and from these, suggest corrective practice.

This approach is labor intensive, slow, and error prone, and cannot be manually performed with sufficient frequency for each typical writer to create a large enough body of identified errors to accurately deduce error patterns, relationships between accurate translation and errors, and prioritize practice appropriately. Corrective action is, therefore, generally limited to admonition to writers to perform simple repetition of previous practice punctuated by drill practice on standardized material containing content similar to words and passages in which writers have made errors in the past or on word lists composed of corrected versions of the errors themselves. Such corrective action tends to create a practice environment in which each writer attempts to correct each error in sequence before moving on to the next error, and does not prioritize practice to try to eliminate the largest causes of errors or the most frequently made errors first, the second most frequent next, and so forth. Thus practice tends to be time-intensive, demotivating, and tends to confuse improvement in translation accuracy based simply on acquired familiarity with the repeated material with improvement based on elimination of the writing habits which caused the errors.

Furthermore, current practice does not easily allow data on the practice results and progress of large groups of writers to be aggregated and analyzed with a view toward predicting which habits and sequences of activities which, if performed, have the highest likelihood of achieving success among writers at large.

Each writer, therefore, practices alone with substantial uncertainty as to the efficacy of his or her efforts. As a result, machine and voice stenographic training programs experience exceptionally high levels of attrition as writers become discouraged and frustrated by lack of perceived progress.

To address this problem, computer programs have been developed to help writers and teachers identify errors in writings. These programs have been primarily concerned with presenting a translation of the stenographic or voice-written writing with errors noted in some sequential fashion. The writer then is expected to view the errors identified. This focus on linear error identification is rooted in the manner in which stenographic machine writers traditionally have performed their jobs: capturing the record in some form of a file, reviewing the file after capture to identify and correct errors, and then producing a typed or word-processed transcript of the file with corrections as a work product. However, as a tool to eliminate future errors, these error identification-oriented programs display significant problems with respect to performing true writing analysis and evaluation beyond simple error identification.

Current Art, Type I

The first type of programs is computer-assisted translation (CAT) software programs. Examples of these types of programs are Case CATalyst™ by Stenograph, L.L.C.; Total Eclipse™ by Advantage Software, PROCAT by Advance Translations Technology, DigitalCAT by Stenovations, and others. While not developed for the purpose of error identification, these programs have some capacity to perform this function.

These programs contain databases of "outlines" and their respective English language equivalents. These databases are called "CAT dictionaries."

When the stenographic writer writes a file into the program, the program will display a text of the translation performed against the CAT dictionary and will note certain types of errors. Writing is compared to entries in the CAT dictionary to achieve the translation. For example, if an entered "outline" does not match any entry in the CAT dictionary, the display will note the untranslated outline in some fashion. If a specific outline has been entered into the dictionary to represent more than one English language word, the CAT program will display the possible translations as "conflicts" which the user must select from to create an appropriate translation. The CAT program, when prompted, will typically display a percentage score of accuracy of translation.

Using a CAT software program imposes several significant disadvantages on the writer with respect to error identification. First, since there is no reference master text against which the writing is compared, missing elements of the dictation not included in the writing are not identified. Second, writing the wrong word (i.e., writing "the" instead of "this") will not be identified as an error if the incorrectly written word's outline and translation exist in the CAT dictionary. Third, many CAT programs include artificial intelligence features which automatically correct errors before display thus preventing the writer from recognizing some portion of his or her errors at all. Fourth, since translation in a CAT program depends upon the incorporation of a CAT dictionary, each writer must maintain and constantly update this dictionary in order to achieve a useful level of translation. This presents a particularly difficult problem for student writers who typically have not yet constructed extensive CAT dictionaries. When such an appropriate dictionary is unavailable, many correctly written words may display as errors simply because their outlines are not contained in the CAT dictionary. This deficiency tends to render performance progress difficult to discern. Fifth, current CAT programming technology makes no attempt to analyze or compare errors identified as to type, frequency, or relationship. Sixth, current CAT technology, because it does not store reference masters for comparison, also does not dynamically create prescriptive practice from the context of submitted writings and/or identified errors.

Current Art, Type II

The second type of current art are web-resident or local computer resident programs that allow a user to input a file written either on a stenographic writing machine connected to a computer equipped with a CAT software package or in a voice recognition software program and compare said file to a stored text document. Such comparison typically produces a report which generally presents the writer a reproduction of the writing with errors noted sequentially as they occurred in the writing, and gives some indication of the percentage of accuracy of the input file compared to the reference master. Examples of current and prior art of this type within the stenographic industry include: The Professor by Stenograph, L.L.C.; Mentor by Advance Translation Technology, dba PROCAT; and Realtime Coach™ by Realtime Learning Systems, Inc.

The current art of this type is generally adequate for identifying many errors sequentially as they occur in a writing. In such examples of the current art, identification of errors is typically based on document compare software technology wherein discrepancies and missing words are noted. As such, this type of current art still displays significant deficiencies with respect to writing analysis and evaluation.

First, the error reports typically generated by the current art compel the writer to review errors in the sequence in which they occurred rather than by commonality of error, frequency of occurrence, or other deduced pattern. Thus each writer must address each error individually.

Second, error identification alone leaves the writer with few options for prioritizing practice time beyond simply repeating the practice or segments thereof sequentially, attempting to correct each error in sequence during the repetition. Indeed, much of the current art of this type is primarily concerned with "realtime" error identification. In such an environment where the programs are analyzing writings as they are being created, linear display of identified errors in sequential format may be the only feasible method of display. However, with respect to remedial practice, this presentation format does not allow writers to focus on types or kinds of similar errors easily. Beyond making distinction between punctuation and word errors, the current art typically does not aggregate errors by type or specifically disclose frequency of different types of errors. This deficit also makes it difficult for the current art to facilitate easy identification of the relationships between different types and kinds of errors or the relationship of accurate or good writing to writing errors.

Third, the current art apparently does not attempt to create unique, dynamically generated, contextually extracted, prescriptive practice based upon extracting the errors in a writing, correcting them, and then extracting surrounding context and presenting the corrected error within it to allow the writer to focus subsequent practice on remedial needs properly.

Fourth because the current art does not apparently concern itself with extensive categorization of error types, kinds, or frequencies, it does not offer a method to concentrate or focus practice on error types. The writer is thus left to analyze the report trying to determine practice priorities and take appropriate corrective action. This process is labor intensive and significantly reduces the amount of writing which may be done in any given period of practice time, as some portion of each practice session must be dedicated to interpreting the error data presented.

Fifth, the current art does not provide sufficient capability to create remedial practice based upon contextually anchored corrections of the writer's identified errors as a part of the analysis process. The writer is then required either to simply repeat the original practice hoping to recall the errors made and try not to make them again, or to practice pre-populated practice material. The pre-populated material, which, while it may include words or other elements similar to those in which the writer made errors, does not include corrected versions of the exact errors or the precise context in which the error occurred. Since a significant portion of stenographic writing errors occur because of difficulty in correctly translating context previously heard, the present lack of contextually derived prescriptive practice creation significantly reduces the usefulness of the error identification in terms of facilitating writing improvement.

Sixth, the current art favors the writing of each file to be performed "realtime" into the error analysis program, and such programs typically take input directly from a realtime session invoked in the CAT program. Thus, files cannot be written or edited and uploaded for later analysis. This tends to limit the use of the current systems to those writers who are proficient in or at least comfortable with realtime stenographic writing, the most difficult of all stenographic writing, so it tends to restrict the use of the current art to those practice instances which are likely to be the most inaccurate. Such restriction poses the disadvantage of making it more difficult to distinguish a writer's structural writing problems from those which result from simply attempting new material containing unfamiliar vocabulary or performing at a new and higher rate of dictation speed.

Current Art, Type III

The third type of current art available is the traditional word processing applications software program with document-compare capabilities such as Microsoft Word™. To use this type of program, the writer would need to have access to a CAT program able to send output to the application program, and the writer would need to have a reference master text file of the original dictation written. Since the latter is rarely available to the writer, this type of current art is rarely used for stenographic error identification.

In those in situations instances where such is available, the limitations of the document-compare capabilities of such programs place the writer at the following disadvantages. First, the discrepancies are noted in linear fashion with no automatic capability to organize them by categories without intervention by the viewer. Such necessary organization would then be labor intensive and error prone. Second, such programs do not typically create prescriptive practice materials extracted from the context of the writing. Finally, the current art does not contain features which might easily be used to aggregate writer performance data from large groups of writers, to associate writing events with performance conditions at the time of writing, or to facilitate data reduction to help create predictive practice models.

What is needed is a computer program method and process that is widely accessible to a plurality of stenographic writers and which can be used to perform not only error identification, but instantaneous extensive category-based analysis of writings allowing writers to easily see comparative frequency, distribution, and relationships among errors and error patterns. Further, this method should also automatically create from each analysis unique, contextually derived prescriptive practice constructed from the precise stenographic writings input and errors made therein, regardless of CAT program type or CAT dictionary used, with the ability to analyze both realtime and non-realtime writings. The method should collect data on performance conditions at the time of writing, associate such data with writing analysis, and store data in such form and to such extent as to facilitate the reduction of said data through commonly used statistical analysis tools with a view toward constructing predictive practice models for use by future writers.

SUMMARY AND OBJECTS OF THE PRESENT INVENTION

Accordingly, it is a primary object of the present invention to overcome the above-described disadvantages of the current and prior art through a method of performing category-based analyses of writer files above and beyond simple, linear error identification. In an exemplary embodiment of the invention, a computer program is used to generate a multi-pass lexical analysis of a submitted stenographic writing sample compared to a selected text reference master stored in the program database. Through the process of lexical analysis, tokenization, and parsing performed by the program, the errors are not only identified but are tabulated and grouped into a plurality of categories which are then displayed by type, with frequency of errors noted by category, and color coded for ease in error pattern and relationship identification.

Another object of the invention is, though said computer program, to simultaneously use the categorized error elements identified to extract context segments containing corrected errors from the writing and master file used in each analysis, thus creating individualized practice based upon the individual writer's errors and error patterns, and present these to the writer for structured remedial practice individualized to each writer's personal needs. Another object of the invention is to aggregate all individualized practice for presentation wherein all practice associated with correcting errors of a particular category may be accomplished distinctly and separately from practice associated with remediation of other categories of writing errors.

Another object of the invention is to extensively categorize error analysis so as to allow the writer to prioritize and focus practice based on considerations such as frequency of errors by category, patterns of error occurrence, and user preference.

Another object of the invention is to provide the writer with the ability to invoke, save and recreate analyses and prescriptive practice at will at any time after the initial analysis is performed thus facilitating progress monitoring over extended periods of time. The categories upon which analysis and prescriptive practice creation are based may include wrong words, dropped words, extra words, punctuation, case, and number mismatches, contraction/phrase transpositions, spelling errors, untranslated and partially translated stenographic entries, compound word errors, plural/singular mismatches and other user-definable categories.

Another object of the invention is to all the analysis to be performed on writings submitted realtime or uploaded from saved writing files.

Another object of the invention is to associate analyses with user-provided data regarding the conditions under which the writing was performed.

Another object of the invention is to aggregate usage data from a wide range of students in searchable databases which can be analyzed in the attempt to facilitate progress monitoring over long periods of time. Once the analysis is completed, analysis results and associated data are stored in such a way that they may be further analyzed to create writer practice models. Said models may be then used to attempt to construct practice patterns predictive of future writer progress with a higher degree of reliability than has traditionally been available.

The invention is enabled by the current art of computer programming, which permits a computer programmer of ordinary skill to perform steps necessary to implement this invention with reference to this description, its appendix, and the accompanying drawings.

DEFINITION OF TERMS

CAT (Computer-assisted translation) program is a computer applications program designed to import a series of strokes executed on a stenographic writing machine and translate them against a table of stenographic writing outlines and their English language equivalents to produce a text display on a computer screen of the spoken word being written by the machine stenographic writer.

CAT (Computer-assisted translation) dictionary is a database table or tables of outlines of combinations of strokes that may be executed on a stenographic machine keyboard and their corresponding English language translations.

Conflict is a term used to describe a single CAT dictionary stenographic outline which represents more than one English language word or expression.

An outline is a series of letters or symbols which may be produced on a stenographic machine or spoken into a voice-recognition software engine to represent an element of English language, punctuation, or character.

Stenography and stenographic refer to the act of reproducing in written or spoken shorthand the spoken word.

BRIEF DESCRIPTION OF THE DRAWINGS

FIG. 3B displays an image of a graphical user interface created by the program of the invention whereby a user may input text created by other software for processing and creation of analysis and evaluation.

FIGS. 9 and 9A display exemplary images of the evaluation result report.

FIG. 13 displays an exemplary image of the graphical user interface created by the invention to recreate an analysis/evaluation previously performed and access its results and created prescriptive practice.

FIG. 17 displays an exemplary image of the display of corrections to identified errors in the results report via tool tip technology.

DETAILED DESCRIPTION OF THE PREFERRED EMBODIMENTS

Figure 1:
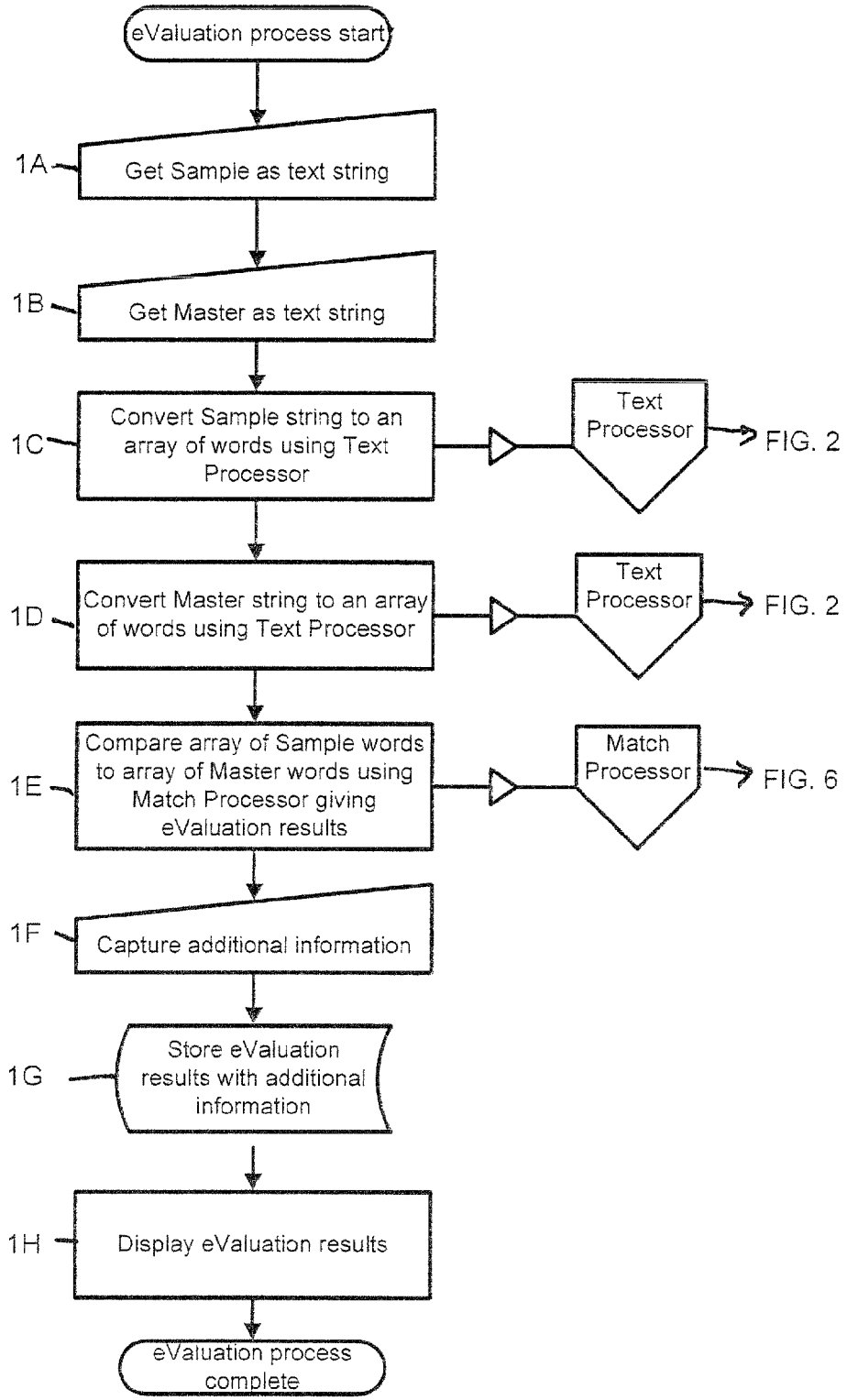
FIG. 1 shows a flowchart of the performance evaluation program process of the invention.

Reference will now be made to the present preferred embodiments of the invention, examples of which are illustrated in the accompanying drawings. The steps required to practice this invention are readily accomplished by a person of ordinary skill in the art of computer software development with reference to this description and accompanying drawings. A flowchart of the computer program process of this invention is found in FIG. 1.

A preferred embodiment of the invention is the process and method of evaluating and analyzing, via a computer program, a stenographic writing simultaneously according to a plurality of possible error categories wherein the result is a report of identified errors presented in display with results for each category of error tabulated and each error identified by a color code corresponding to its assigned category.

Figure 4:
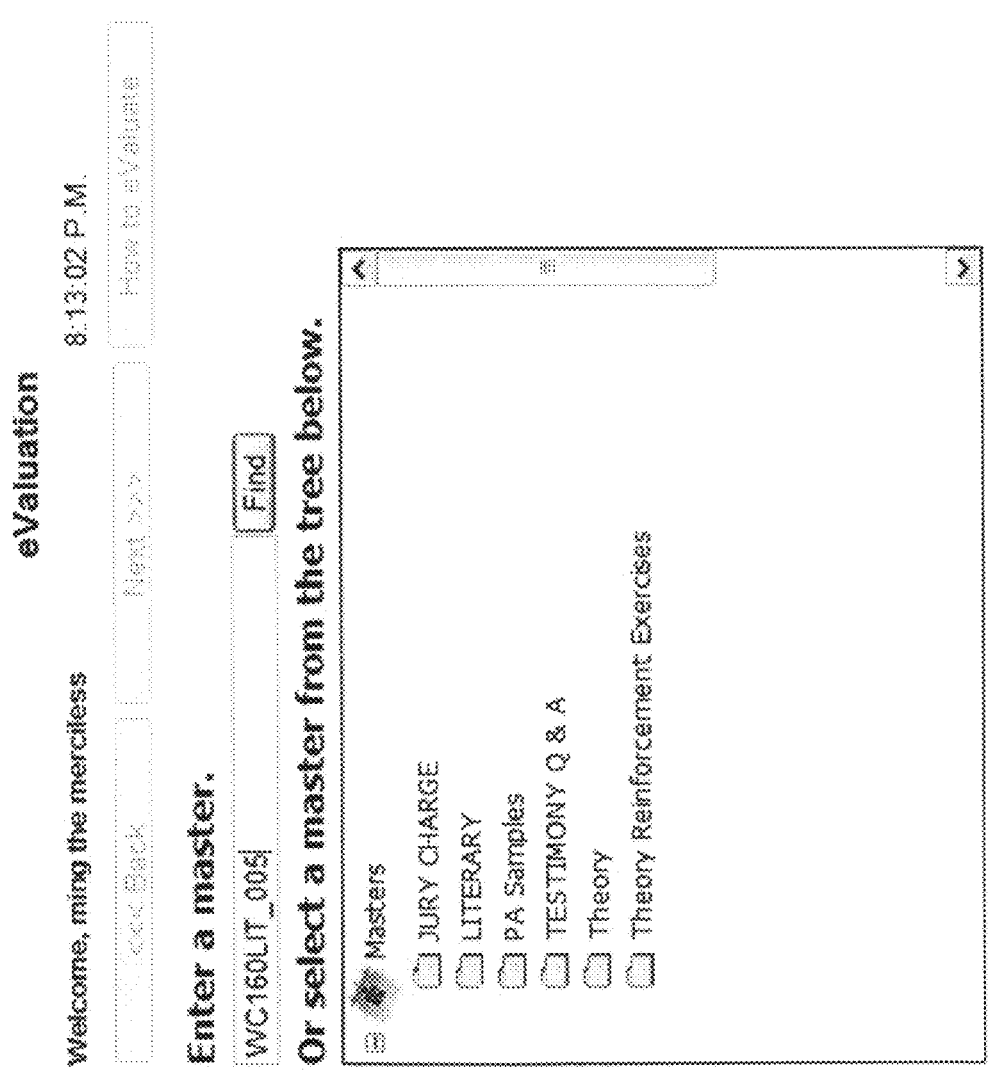
FIG. 4 displays an image of a graphical user interface created by the program of the invention whereby a user may select from the program database a master file against which a submitted writing file can be analyzed and evaluated.
Figure 9A:
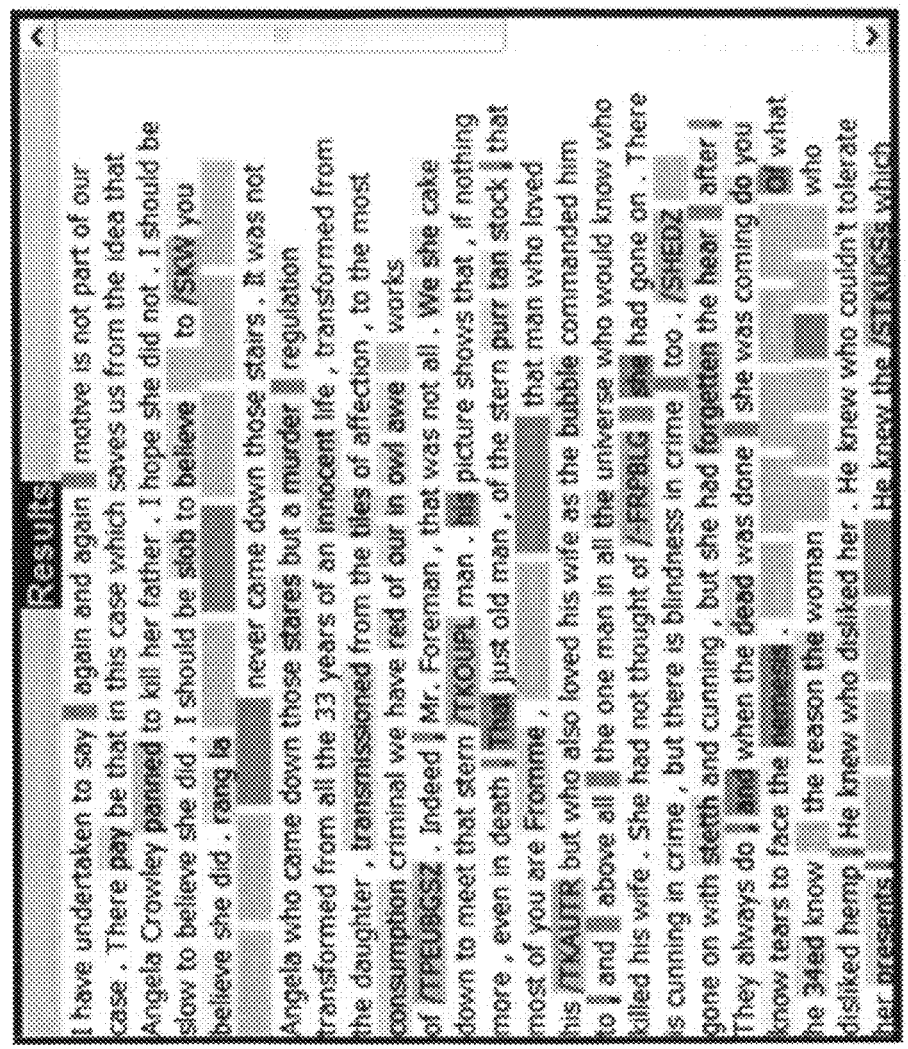
Figure 10:
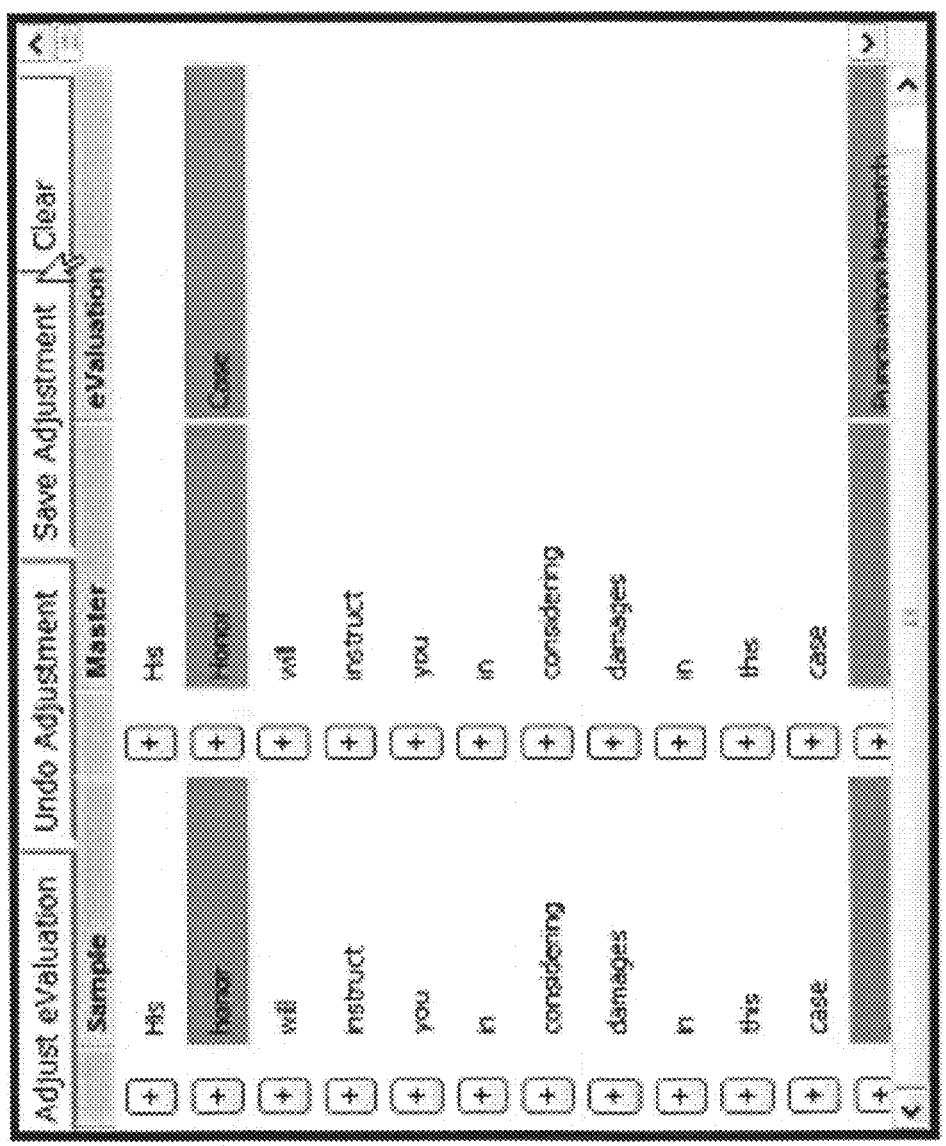
FIG. 10 displays an exemplary image of the evaluation detail report.

The operation of this embodiment proceeds as follows: The evaluation/analysis process begins with a programming process to capture the writing sample to be evaluated via a graphical user interface (1A). The next step proceeds with the program retrieving, upon command of the writer through a graphical user interface (see FIG. 4), a stored master file against which the captured sample writing will be compared (1B). The program through a text processor (see FIG. 2) converts the sample writing string into an array of words (1C) and the retrieved master file into an array of words (1D). The program then compares the array of sample writing words to the array of master file words (1E) using a match processor subroutine (see FIG. 6) which performs iterative word-by-word comparisons of the two word arrays to yield decisions on which words in the two arrays match and which constitute mismatches (errors). The result of the operation of the computer programming process is to yield a report of errors tabulated by categories defined in the match processor subroutine (see blocks 7A' through 7K', 7L of FIGS. 7, and 6E of FIG. 6) and displayed in a category table (see FIG. 8) wherein each category is assigned a unique color-code, and each error tabulated is highlighted in an accompanying Results Report (see FIGS. 9-9A) and Detail Report (see FIG. 10) according to its assigned category color.

A second preferred embodiment of the invention is the programming element whereby the match processor subroutine (FIG. 7) identifies mismatches between the writing sample and the master file selected and returns associated error categories (FIGS. 7A-7L). Context is extracted from the master file and presented to the writer via a graphical user interface (FIG. 11) for presentation as error-linked, prescriptive practice material.

The operation of this process proceeds as follows: For each return as described in FIG. 7 that is not an EXACT MATCH, the program extracts sample word (or character if not a word), locates the corresponding word or character in the master file selected, replaces the sample word or character with the correspondent word or character from the master file, highlights the replacement in the color code assigned to the error category of the return, extracts a string of context preceeding and succeeding the replacement, such string defined by the writer through a graphical user interface (FIG. 11A), embeds the replacement word or character within the extracted word string, and presents the string including color-coded replacement for the return in an onscreen display to the user (FIG. 11B) for use as remedial practice.

Another embodiment of the invention includes a text processor computer program element (FIG. 2) designed to prepare input submitted, either from saved text files (FIG. 3A) or direct input (FIG. 3B) from a CAT program or voice-to-text software engine such as Dragon Naturally Speaking™, and text stored as reference master files for subsequent comparison through a match processor computer program element.

Figure 2:
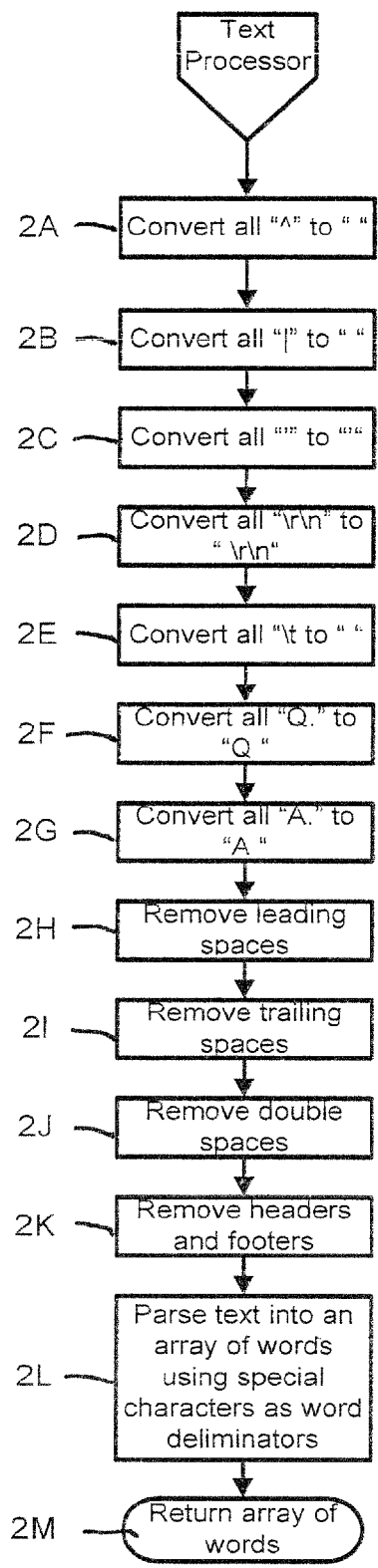
FIG. 2 shows a flowchart of the text processor component of the performance evaluation program process of the invention.
Figure 3A:
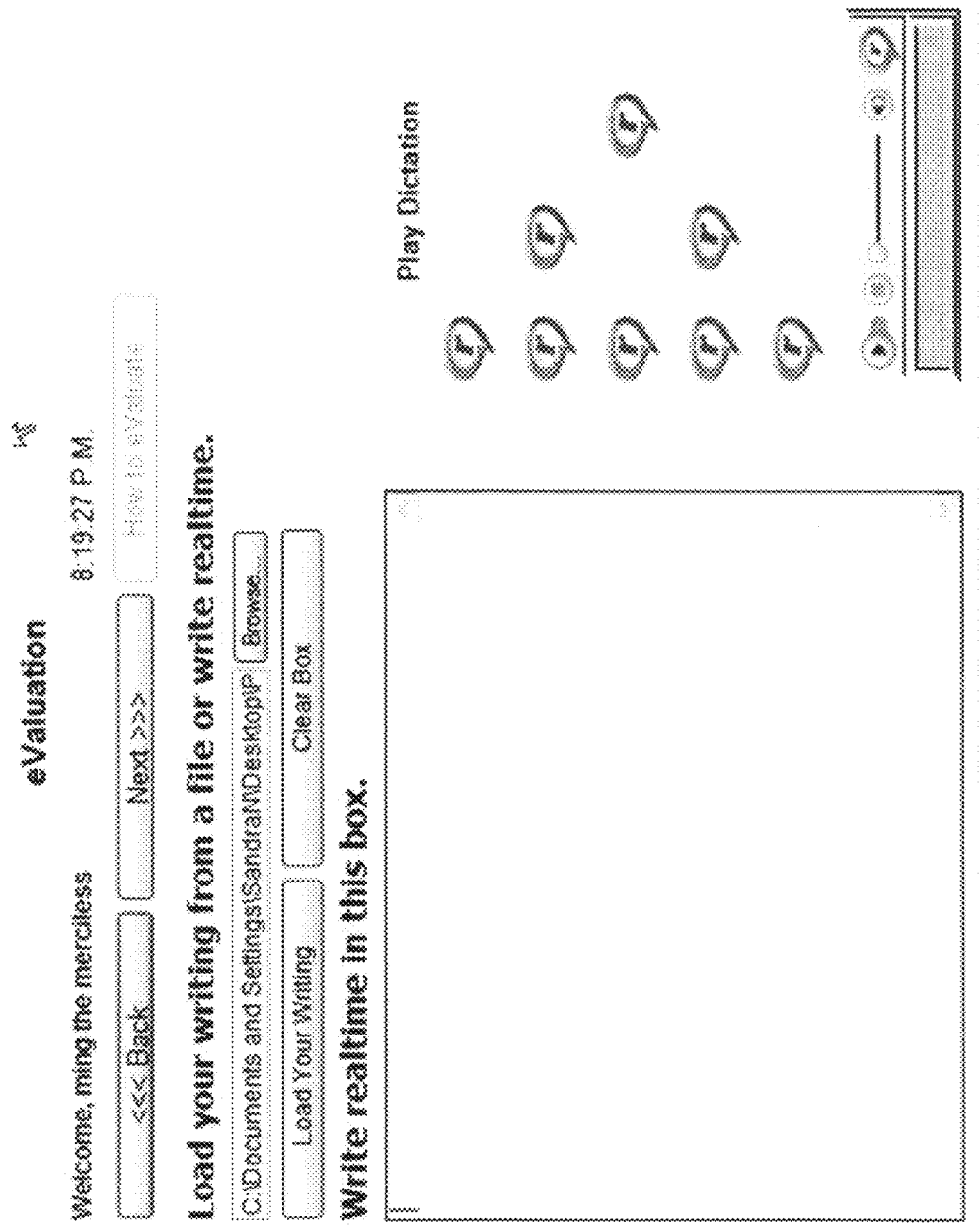
FIG. 3A displays an image of a graphical user interface created by the program of the invention whereby a user may load a saved text file into the program for processing and creation of the analysis and evaluation.

This embodiment, shown in FIG. 2, operates to convert all character elements of the writing sample and master file into arrays of words which can be compared to each other. This operation on begins by substituting certain non-alpha characters with spaces and alpha characters (2A-2G) and removing formatting spacing and symbols (2H-2L) The program then parses the resulting text stream suitable arrays of words suitable for comparison in the match processor using special characters as deliminators (2M).

Figure 5:
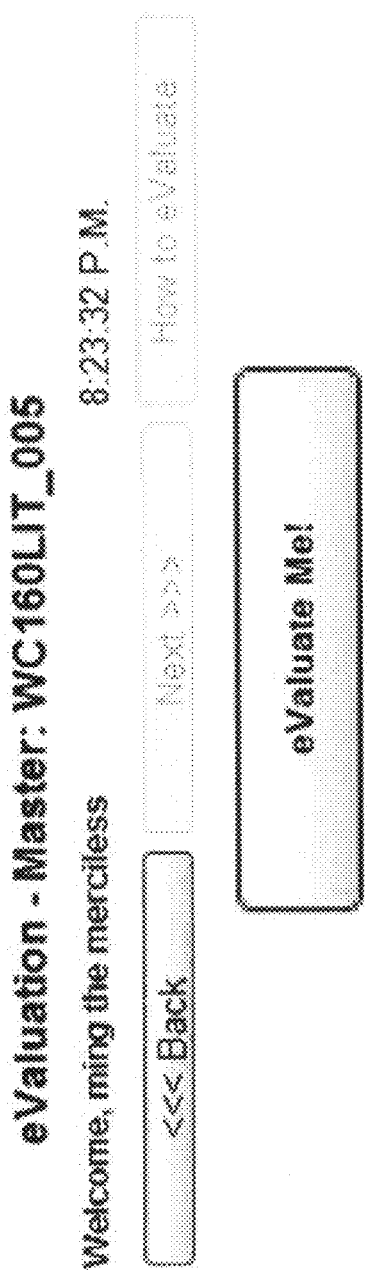
FIG. 5 displays an image of a graphical user interface created by the program of the invention whereby a user may execute via keystroke a command to begin a writing analysis and evaluation.

The text processor operation is initiated upon the completion by a writer of the following steps:
1. A writer submits a text sample through a graphical user interface (FIGS. 3A-3B) to a web-resident or client-server resident version of the computer program containing the text processor, and
2. The writer then chooses a master file against which the computer program will analyze the word elements of the writing sample (FIG. 4) and
3. The writer commands the computer program to begin the analysis by clicking an appropriate command button on his/her display screen (FIG. 5).

Figure 6:
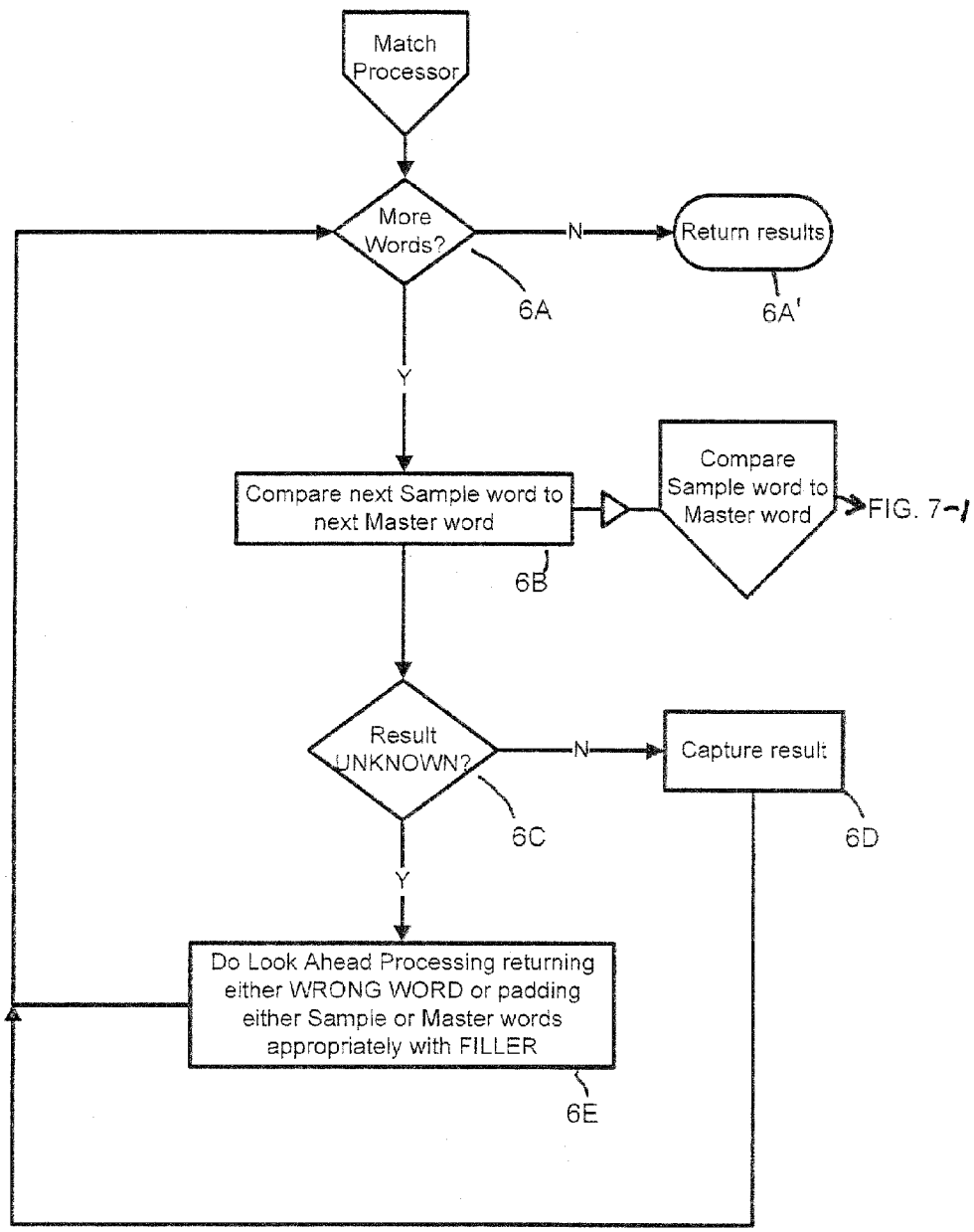
FIG. 6 shows a flowchart of the operation of the match processor component of the performance evaluation program process of the invention.
Figures 1, 7:
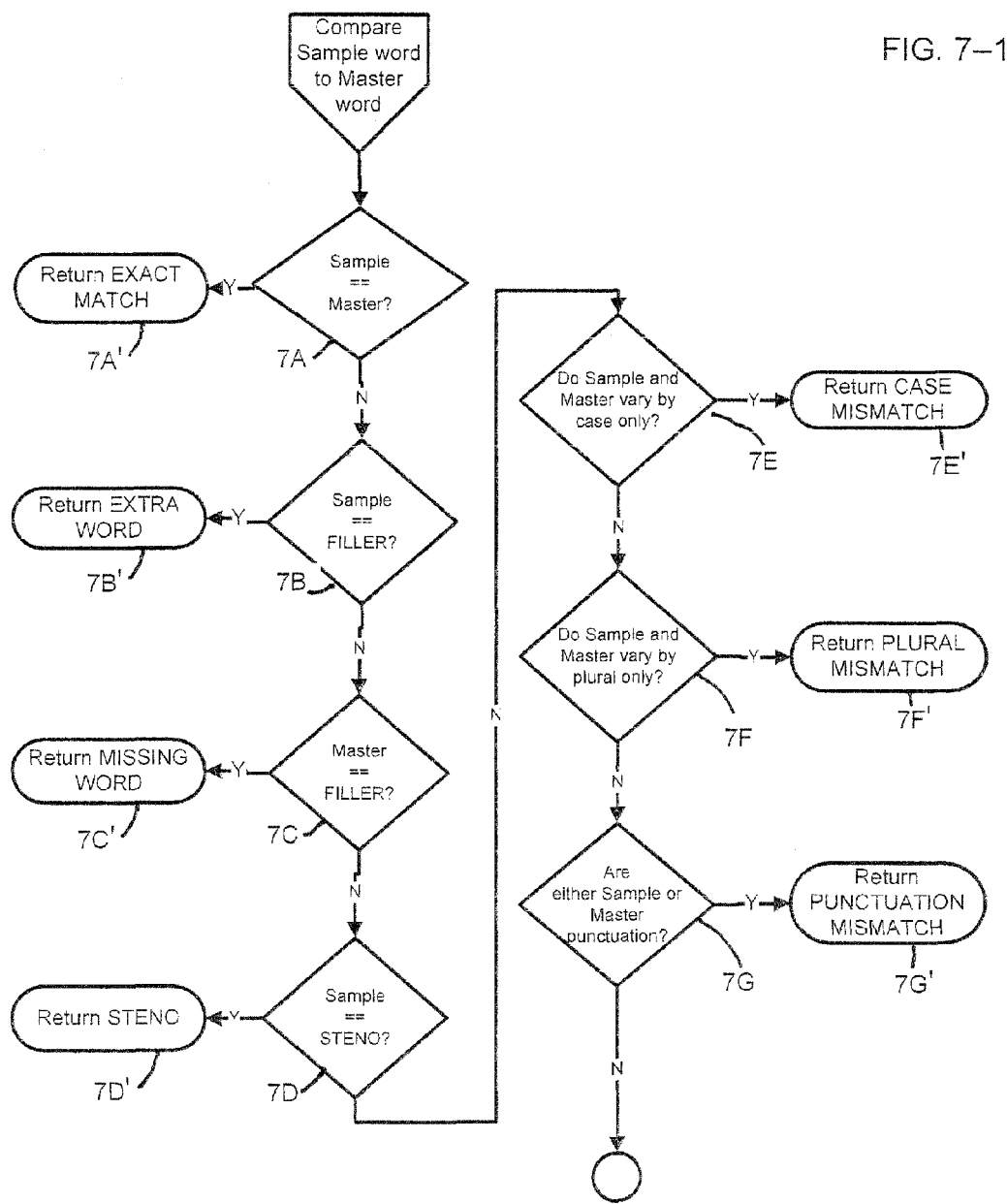
FIG. 7 shows a flowchart of the match processor sample file/master file comparison process.
Figures 2, 7:
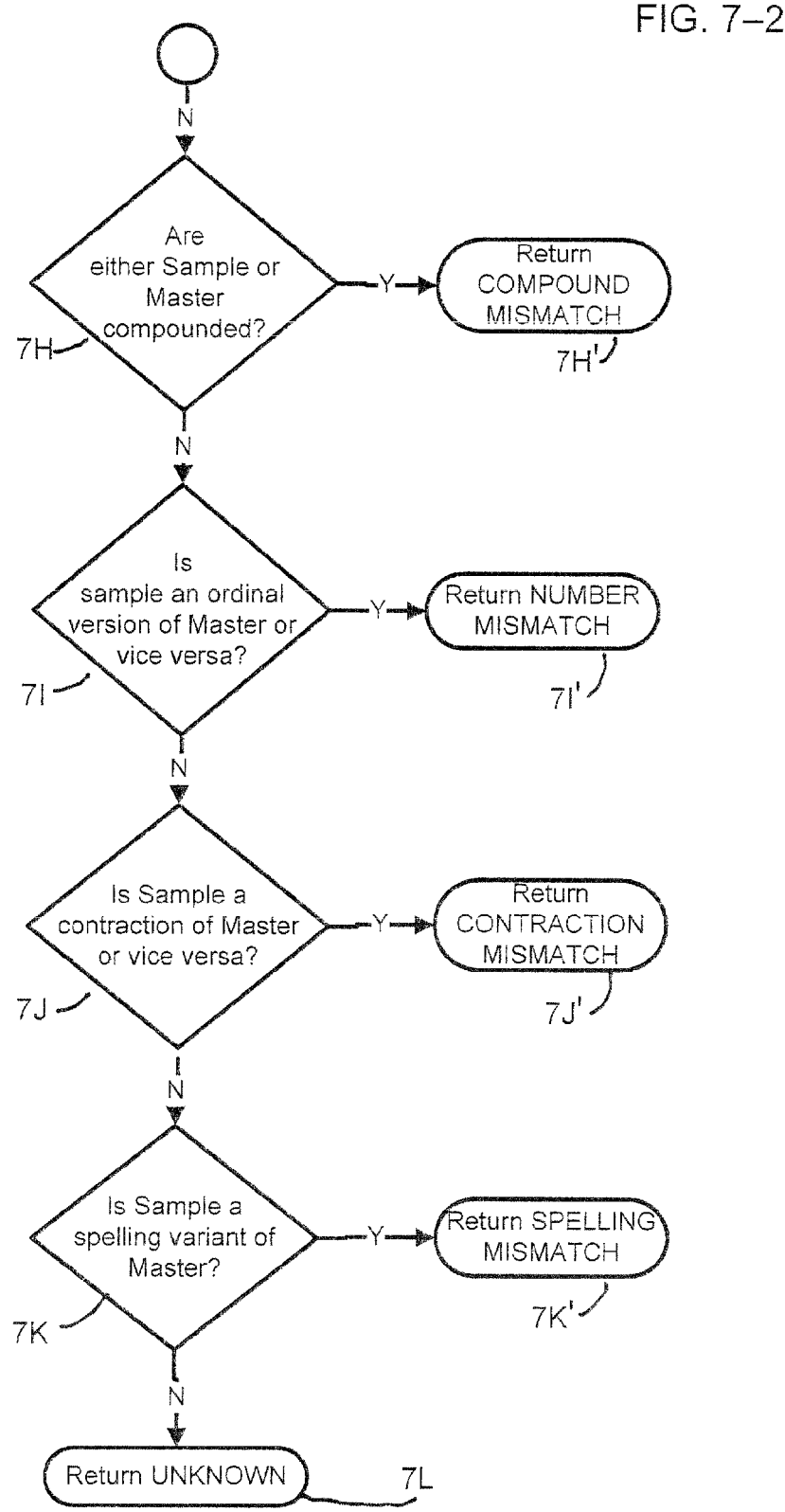
Figure 12:
FIG. 12 displays an exemplary image of the graphical user interface created by the invention to collect data about the conditions under which the writing evaluated was performed for later association with evaluation and analysis results.
Figure 13:
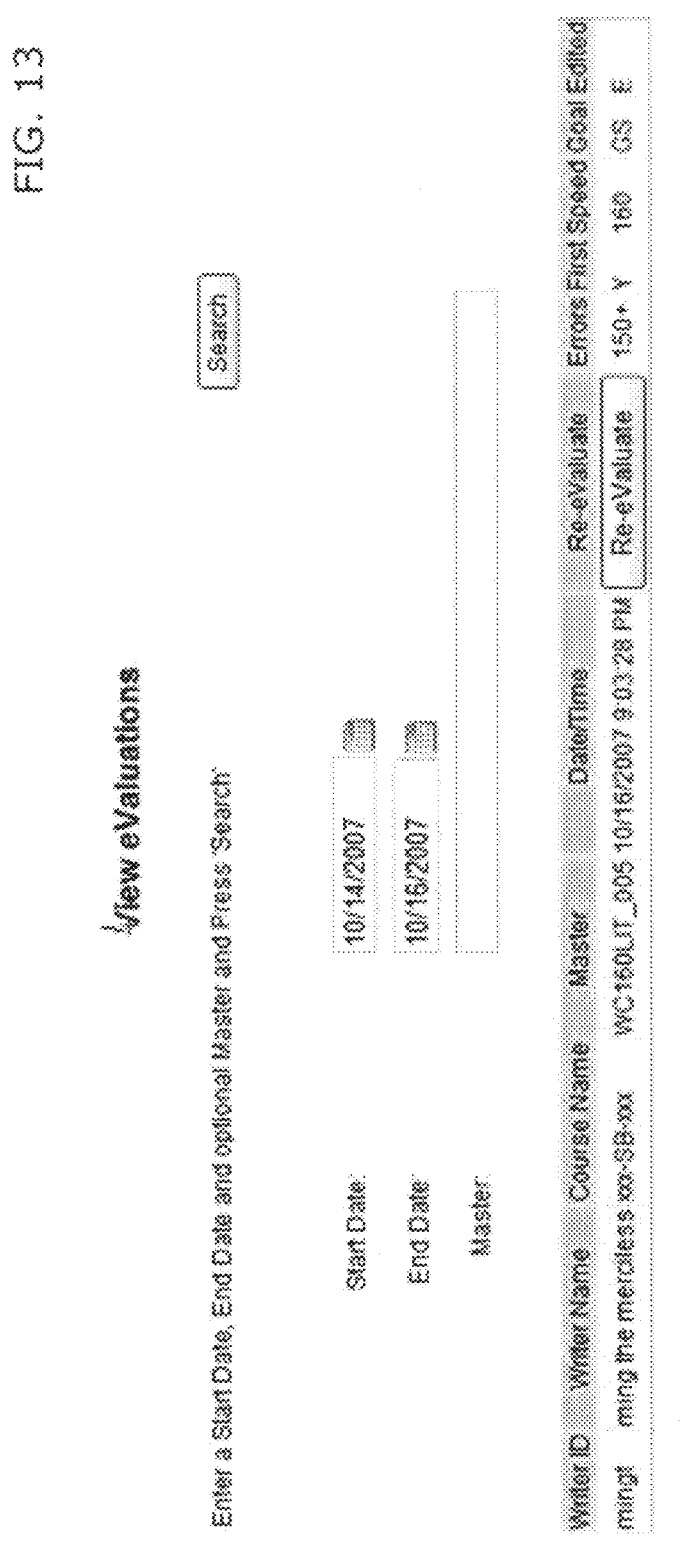

Another embodiment of the invention is shown in FIG. 6, a match processor element of the computer program which compares each word in the writing sample returned by the text processor element of the computer program to each word in the reference master selected. The match processor operates to identify matches and mismatches between corresponding words in the sample writing and selected master. When mismatches are returned, the match processor performs a plurality of comparisons according to the flowchart in FIG. 7 to determine the appropriate category of error. Error categories currently include extra word, missing word, untranslated or partially translated steno outline, case mismatch, number format mismatch, dropped word, plural/singular mismatch, compound word mismatch, contraction/phrase mismatch, phrase/contraction mismatch, spelling mismatch, and mismatch based on a user selected category. Word and character comparisons may be performed through a look ahead process individually or in word strings of varying length to accommodate matching under circumstances where the submitted writing may consist of transposed text or other character material, missing text or other character material, or additional text or other character material when compared with the reference master. Look ahead processing allows the match to proceed isolating any sequences of the sample that do not match a corresponding sequence in the master file (6E). This prevents a non-matching sequence from disrupting the whole of the analysis allowing subsequent correct matching sequences to evaluate correctly. Look ahead processing is only invoked in an unknown situation after all steps in the match processor sequence have been performed. When an unknown situation results after match processing is completed, the program will pad either the sample writing or master file with filler between the last returned match preceding the unknown and the next returned match following the unknown. Filler displays in the analysis as dropped or extra words as appropriate. Another embodiment of the invention is a subroutine included in the computer program referenced as step 1G of the evaluation process performed by the invention. This embodiment presents the writer with a graphical user interface designed to capture information regarding the conditions under which the writing being analyzed was written (FIG. 12). This embodiment operates to collect certain data which are then stored (FIG. 13) in conjunction with the analysis produced by the computer program for later retrieval.

Figure 8:
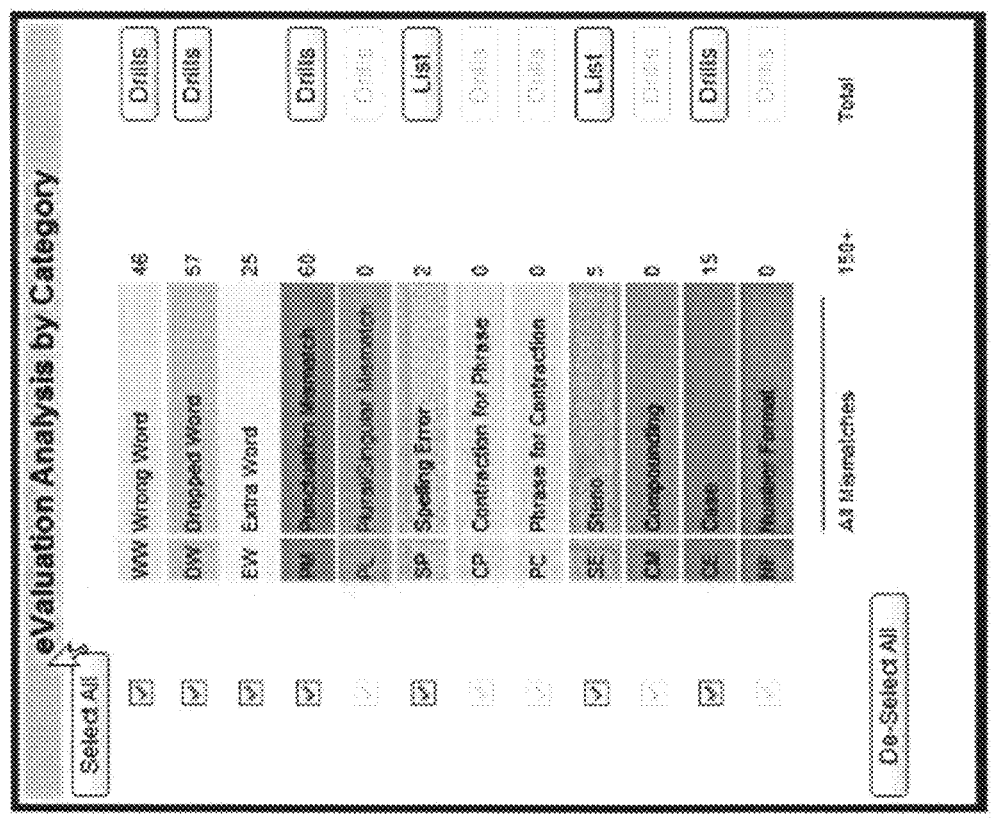
FIG. 8 displays an exemplary image of the evaluation analysis by category with color coding.

Another embodiment of the invention is the process of category-based analysis performed by the computer program wherein match processor results are aggregated by category, errors grouped and tabulated by category, and category error totals displayed through a graphical user interface (FIG. 8). The graphical user interface is designed to allow the writer to select categories to be displayed in any combination the writer wishes, and displays error totals in aggregate and by category.

Figure 14:
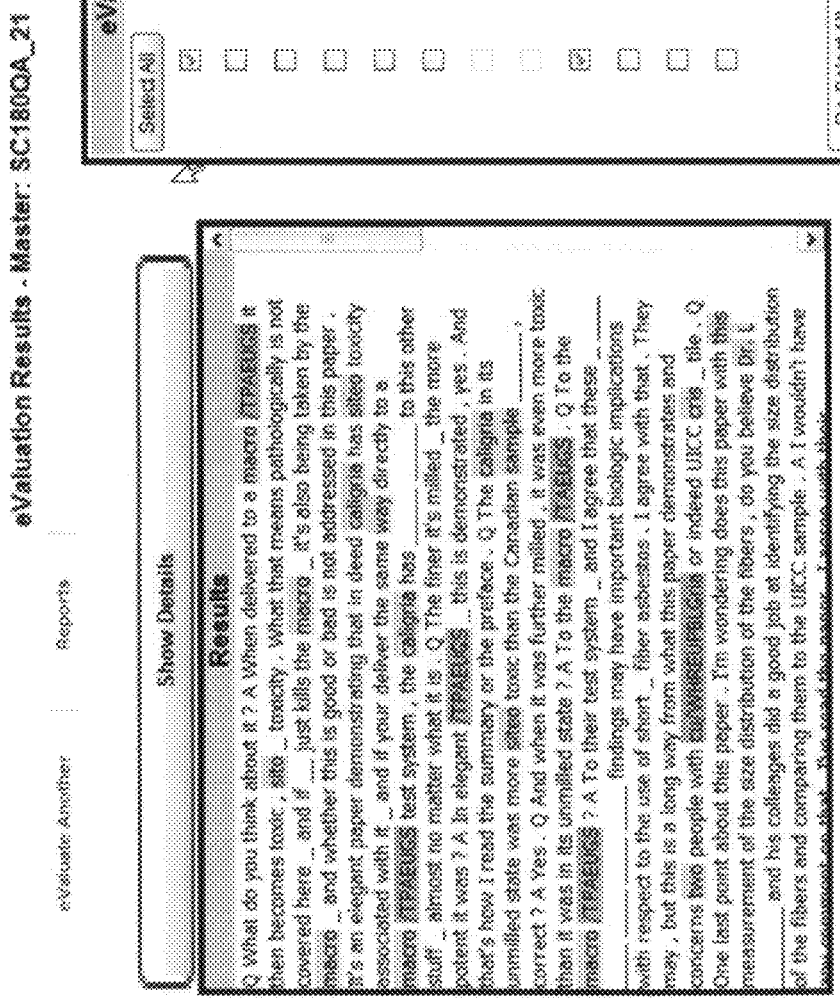
FIG. 14 displays an exemplary image of the graphical user interface created by the invention to allow users to control the display of results by selected category or group of categories.
Figure 15:
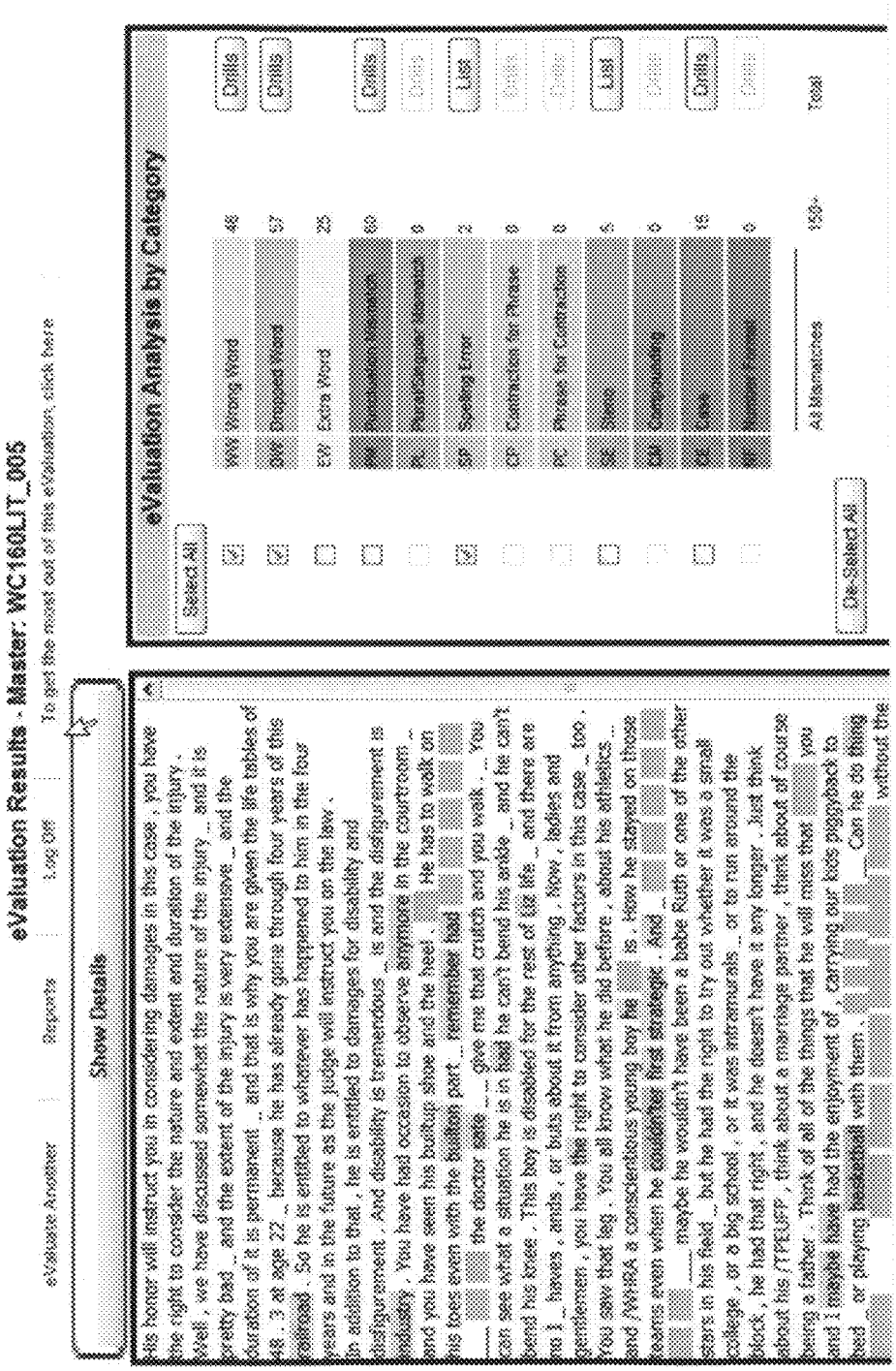
FIG. 15 displays an exemplary image of results, detail and category-based analysis reports adjusted for a user-defined subset of the available analysis categories FIG. 16 displays an exemplary image of the graphical user interface created by the invention to allow users to define additional categories for analysis from words, word groups, and/or word parts.

The display is operated by the writer through the placing or removing of check marks in boxes on the user's display and clicking appropriate commands to display corresponding errors within the context of the writing (FIG. 8A). Upon executing the appropriate on-screen commands, the writer is able to manipulate the display of various error types individually or in combination. (FIGS. 14-15).

Another embodiment of the invention is the display of writing analyses and evaluation in multiple, color-coded formats through the use of a graphical user interface in the evaluation display. Through the operation of this embodiment, the user may view multiple views of the evaluation results including:
1) A color-coded linear presentation of the writing submitted with errors in the writing (when compared to the master) highlighted in color codes corresponding to specific categories of errors identified in the analysis performed. (FIG. 9) Associated with this feature is a graphical user interface contained in the program allowing the user to display via tool tip a correction for any identified error in the color-coded display (FIG. 17).
2) A tabular comparison of each element of the writing submitted compared to each element of the reference master with errors in the writing (when compared to the master) highlighted in color codes corresponding to specific categories of errors identified in the analysis performed. (FIG. 10)
3) A color-coded summary table of error totals organized by category with error totals for each category displayed in tabular format. (FIG. 8)

The multiple-display formats allow the writer to compare the analyzed writing element by element to the reference master; compare the frequency of various categories of errors; select personal categories for additional analysis; and observe patterns of errors and correct writing in conjunction with each other to determine relative relationships between and among them.

Another embodiment of the invention is the process of dynamic creation of prescriptive practice as a result of each evaluation performed by the program. The prescriptive practice is created by the match processor returns as a data output of the program. The manner in which this occurs is as follows:
1) The computer program returns a result for each comparison which does not produce an exact match between sample writing and reference master (7A' 7K', 7L)
2) For all non-match situations except Return Steno (7D') the computer program extracts the corresponding reference master file word or other character, and
3) Displays the extracted word or other character surrounded by a segment of surrounding text content from the reference master file, said segment being defined by various user selections made through the graphical computer interface.
4) For non-match situation resulting in Return Steno (7D') the computer program extracts the non-matched steno from the sample writing being analyzed, and
5) Displays the extractions surrounded by a segment of text content extracted from the portions of the reference master file immediately preceding and succeeding the master file word or character compared to the non-matched steno in the sample writing being analyzed.

Figure 11:
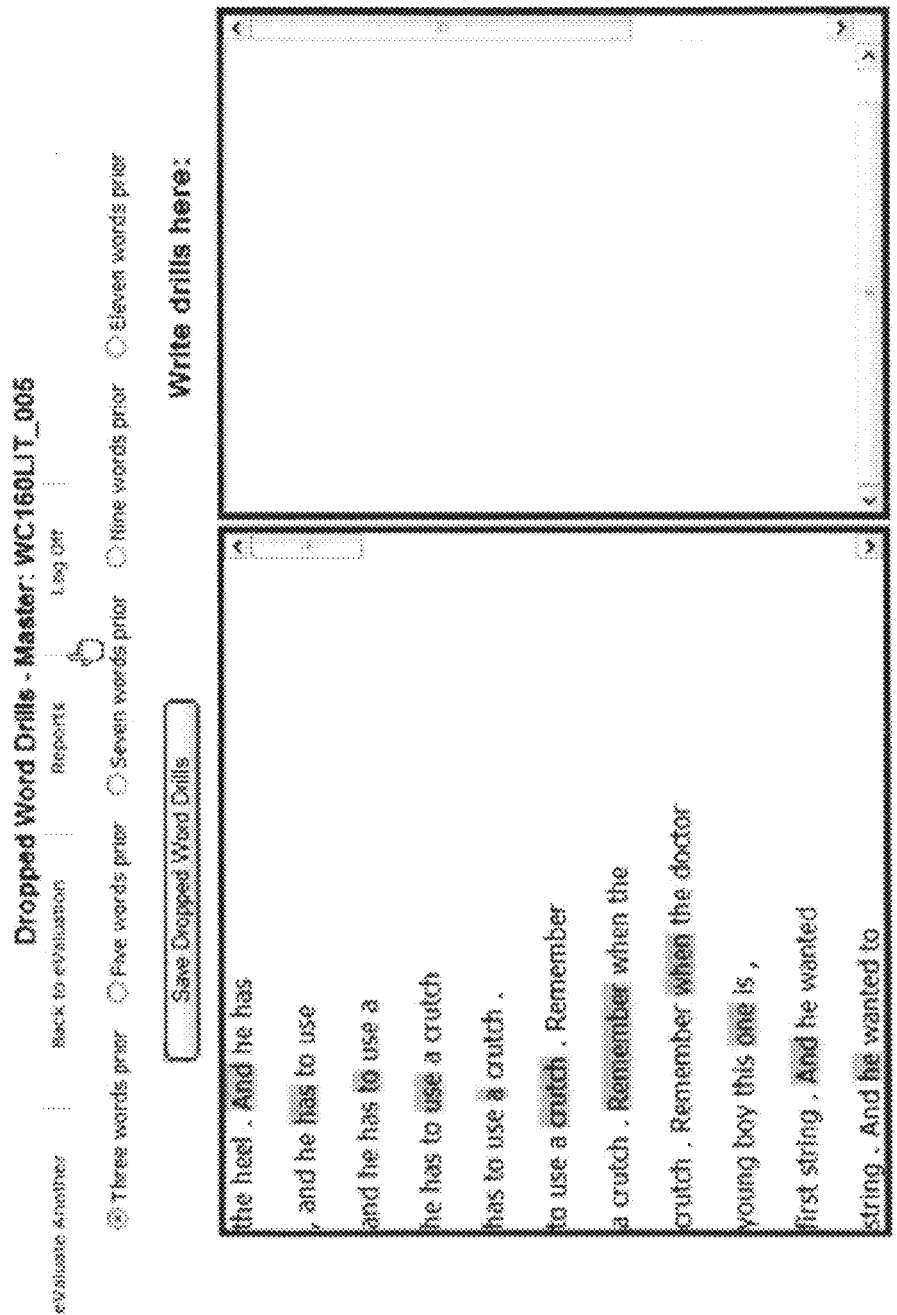
FIG. 11 displays an exemplary image of the graphical user interface created by the invention to deliver dynamically created prescriptive practice extracted from the content of the writing analyzed.

The user may then practice on the resulting prescriptive practice created at that time, or save it to his/her local computer or memory storage device for later use. (FIG. 11)

Another embodiment of the present invention is a process and method of the program whereby a user may create additional categories from words or word parts against which the writing sample may be analyzed and additional personalized prescriptive practice created therefrom.

Figure 16:
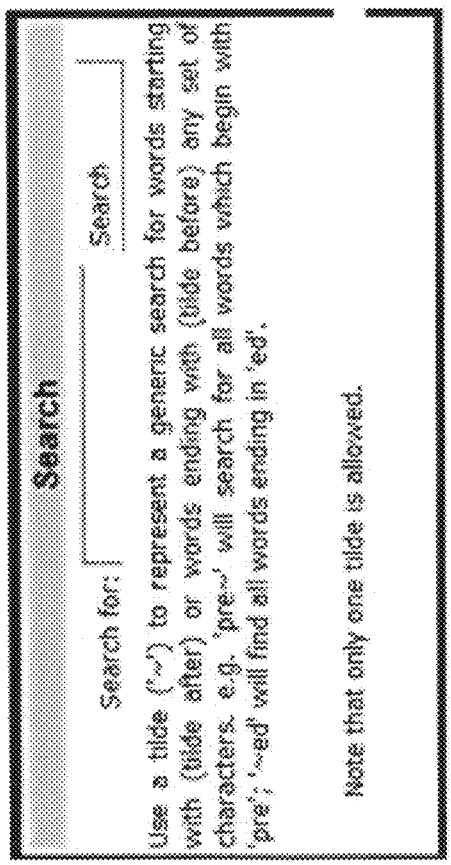

The operation of this embodiment involves the user entering commands into a graphical user interface created by the computer program wherein the new categories are specified (FIG. 16). The user then enters a command to search the writing for the specified new category and return a report of incidents of appearance of the category in the master document. The computer program generates a report showing the words or characters in the master corresponding to the specified new category and the corresponding words or characters in the writing sample submitted. Simultaneously, the computer program extracts the selected word or character and elements of the text surrounding it to create additional prescriptive practice based on the user's defined categories.

Another embodiment of the invention allows the recreation of previously created analyses and prescriptive practice through a graphical user interface created in the computer program (FIG. 13A). This embodiment also allows the association of data collected on the conditions under which the writing was originally performed (FIG. 13B) to be associated with the analyses for review and long-range progress monitoring.

ADVANTAGES

From the description above, a number of advantages of some embodiments of the present invention become evident:
1) Comprehensive, category-based analysis will allow writers to quickly identify not just individual errors but type, frequency, and distribution of error patterns specific to each writer, and so facilitate the effective prioritization and allocation of practice time for each writer.
2) Dynamic creation by the software of prescriptive practice from the context of writings built around corrections of errors made will allow each writer to focus available practice on areas specific to each writer's unique progress and needs.
3) Aggregation of prescriptive practice created by category will allow each writer to concentrate on multiple incidents of the same type of error. This advantage will be enhanced by the embodiments allowing selection of categories or category groups for attention by individual users, and by allowing users to define additional categories for writing analysis and use these for further prescriptive practice creation.
4) Writers and their teachers and mentors will be freed from the need to perform labor-intensive numerical tabulation and cross-referencing of errors to determine remedial needs of each writer.
5) The creation of a database of performance data on multiple writers will, over time, allow performance analysis to be performed for large groups of writers, facilitating the identification of practice patterns common to successful and unsuccessful writers.

CONCLUSION, RAMIFICATIONS AND SCOPE

Accordingly, the reader will see that the evaluation and analysis system disclosed in the various embodiments of the invention can be used to create a comprehensive, stenographic writing analyses system which will greatly enhance the effectiveness of stenographic writing practice through the provision of comprehensive, focused information on individual writer performance and the creation of personalized prescriptive practice which specifically addresses each writer's needs for accuracy improvement. Such an invention should provide the potential for higher percentages of writers to achieve performance levels to progress faster and more predictably through training and offer a correspondingly higher percentage of opportunity to successfully accomplish their training objectives while reducing the amount of time spent in non-productive practice.

In addition, the present invention will allow the collection of a database of stenographic writer performance data from many users which, over time, may be statistically analyzed to provide a predictive model for establishing future writer progress.

Although the description above contains many specificities, these should not be construed as limiting the scope of the embodiments, but merely as providing illustrations of some of the presently preferred embodiments. For example, the category-based analysis may include other categories than those referenced; prescriptive practice created may be in the form of elements of recorded speech corresponding to the text elements of the current master files rather than displayed versions of said text elements, etc.

Thus the scope of the embodiment should be determined by the appended claims and their legal equivalents, rather than by the examples given.

We claim:

1. An automated computer based method of evaluating a stenographically written or voice-written writing performance file according to pre-determined and user defined categories through a computerized system of analysis operated by a computer program, comprising:
   submitting and deconstructing, by a computer, the writing performance file into a series of manageable word arrays; and
   comparing, by a computer, the words in the series of manageable word arrays to corresponding words in a master data file on the basis of a repeating set of a plurality of evaluation criteria processed and applied through a pre-determined sequence which a writer can invoke for a computerized comprehensive analysis, comprising identifying errors, categorizing the errors by type and frequency, and dynamically generating and displaying sets of prescriptive practice drills based on the identified errors,
wherein said drills are grouped by category and built from a corrected version of each identified error and embedded in content in elements from the master file immediately preceding and succeeding the corrected error and wherein the writer can use the corrected version of each identified error to quickly identify areas of performance deficiency and execute corrective practice to overcome said deficiencies.

2. The automated computer based method as recited in claim 1 wherein the analysis is based upon and includes a series of categories upon which the resultant evaluation will be performed including but not necessarily limited to dropped words, extra words, wrong words, spelling errors, number format mismatches, plural/singular mismatches, word boundary errors, phrase/contraction transpositions, punctuation and case mismatches, untranslated or partially translated steno outlines, whereby errors identified can be organized so as to display frequency by category allowing writers to identify concentrations of similar types of errors for more efficient practice focus.

3. The automated computer based method as recited in claim 2 further comprising a graphical user interface allowing the user to define additional categories to be included in the category-based analysis and associated prescripted practice creation provided by the category-based evaluation process.

4. The automated computer based method as recited in claim 2 wherein a pre-determined sequence of color-codes are incorporated into the method of displaying the resultant category-based error analysis and evaluation whereby error relationships and frequency are easily discernible by the writer who is then able to make appropriate decisions allocating available practice time to the most critical areas for his or her personal performance characteristics.

5. The automated computer based method as recited in claim 4 wherein a tabular display compares each word or character element of the writing sample submitted to each corresponding word or character element of the master file with resultant non-matches noted and highlighted in the color-codes corresponding to the category based analysis.

6. The automated computer based method as recited in claim 5 wherein a graphical user interface is included to allow the user to move from each identified error to a corresponding error line of the tabular display.

7. The automated computer based method as recited in claim 4 wherein the evaluation analysis with errors identified and color coded according to the category based analysis performed may be displayed as a single continuous results file whereby users may easily identify patterns of categories of errors as they occur throughout the writing.

8. The automated computer based method as recited in claim 7 wherein a graphical user interface is included to display in conjunction with and juxtaposition to each color-coded error identified a correction of said error upon user command.

9. The automated computer based method as recited in claim 2 wherein a tabular display is included in the category-based analysis display to provide the user with specific error totals by category for each writing whereby a user may easily identify and prioritize categories of errors by type and frequency of occurrence.

10. The automated computer based method as recited in claim 1 further comprising a graphical user interface allowing the evaluation of directly input (realtime) files or upload of saved files previously written for evaluation whereby writers may achieve a maximum level of evaluation and analysis of a wide variety of types of practice.

11. The automated computer based method of claim 1 wherein a graphical user interface is included allowing the writer to input data on the conditions under which the writing was created.

12. An automated computer-based method for the dynamic creation of personalized drill practice through the operation of a computer algorithm to identify errors in a stenographic writing according to pre-defined and user-defined categories of errors comprising:
(a) for each error identified invoking, by a computer, the extraction of the error and its surrounding context from text based files, correcting the error by reference to a master file document, and then embedding the correction into an extraction of content, from the original master file surrounding the word element to which the error was compared, and
(b) for each result generating, by a computer, an output presenting the combination of corrected error and context for immediate prescriptive practice, and
(c) presenting, by a computer, each prescriptive practice element aggregated with other prescriptive practice elements developed from errors assigned to the same category of analysis, and
(d) enabling each category of prescriptive practice sets to be accessible distinctly from all other categories enabling a user to execute at will personalized prescriptive practice organized by type and frequency of error.

13. The automated computer based method recited in claim 12 and further including a graphical user interface allowing the writer to select the extent of contextual surround to be used to build the prescriptive practice dynamically created for each error and to adjust said extent of contextual surround according to the category of error selected for practice.

14. The automated computer based method recited in claim 12 and further including a graphical user interface allowing the writer to download and save all prescriptive practice created by the evaluation and analysis process for further, offline practice.

15. The automated computer based method of claim 12 wherein a graphical user interface is included allowing the writer to input data on the conditions under which the writing was created and wherein logic is included in the program allowing the data collected by the graphical user interface to be associated with its corresponding evaluation attempt and displayed upon query of the database containing evaluation and analysis results.

16. The automated computer based method of claim 12 wherein logic is included to allow the recreation of events and sequences of events performed by users and the association of said events with corresponding evaluation results and prescriptive practice activities.

17. An automated, computer based method comprising:
storing and organizing, by a computer, evaluation results data from stenographically written data files translated through a steno character translation software program; and
creating storing, by a computer, prescriptive practice therefrom by the process of analysis and evaluation of the stenographically written data files translated through the steno character translation software program according to a pre-determined and user-definable plurality of categories in a searchable computer database in such manner that said evaluation results data from stenographically written files translated through the steno character translation software program and created prescriptive practice may be recreated and displayed by the user at any time after the initial stenographically written text file evaluation process is completed.

* * * * *